Figure 1:
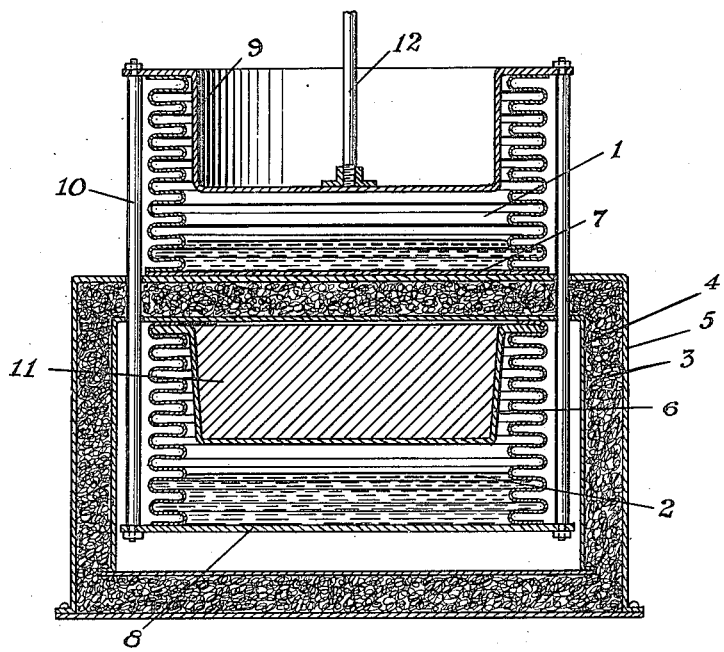

W. M. FULTON.
HEAT MOTOR.
APPLICATION FILED SEPT. 15, 1916.

1,289,435.

Patented Dec. 31, 1918.

Inventor
Weston M. Fulton.
By Mauro, Cameron, Lewis & Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

HEAT-MOTOR.

1,289,435.	Specification of Letters Patent.	Patented Dec. 31, 1918.

Application filed September 15, 1916. Serial No. 120,389.

*To all whom it may concern:*

Be it known that I, WESTON M. FULTON, a citizen of the United States of America, and a resident of Knoxville, Tennessee, have invented a new and useful Improvement in Heat-Motors, which invention is fully set forth in the following specification.

This invention relates to heat motors, and, while capable of embodiment in a variety of structures of this type, is designed particularly as an improvement of the type of heat motor disclosed in my Patent No. 824,858, granted July 3, 1906.

In the type of heat motor to which said patent relates two expansible and collapsible vessels, each containing an expansive agent, have respectively one end wall held stationary and one end wall free to move, said movable end walls being connected. One of these vessels is retarded, as by inclosure within a casing of heat-insulating material, in responding to temperature changes, while the remaining vessel is exposed to such changes. The latter of these two vessels expands or contracts in response to changes of temperature in its surrounding medium, simultaneously contracting or expanding the heat-insulated vessel owing to the temperature difference between them. While this heat-insulating casing has served its purpose of obtaining a retardation of temperature changes in one of the vessels, such casing has had a harmful effect upon the operation of the motor in that it hindered the escape, during contraction of the vessel within it, of the latent heat of vaporization of the expansive agent within the inclosed vessel, and hindered absorption, during expansion of such vessel, of the heat requisite to secure evaporation of said expansive agent. It is an object of this invention to improve heat motors so as to obviate the defect set forth, and to provide a construction wherein the latent heat of vaporization does not materially oppose the operation of the motor. It is a further object of this invention to provide a motor of the type characterized wherein at least a portion of the latent heat of vaporization, given off during contraction of the expansive agent, will be conserved to facilitate the subsequent expansion of the expansive agent within the vessel retarded in responding to temperature changes. A further object of this invention is to provide a thermosensitive device with heat-absorptive means whereby liberation of the latent heat of vaporization of the thermosensitive fluid contained therein shall not materially oppose contraction of the device, and whereby expansion of said device shall not be materially opposed by an absence of the requisite heat. Further objects will appear as the description proceeds.

Stated briefly, the invention comprises two expansible and collapsible vessels each containing an expansive agent, one of said vessels being preferably retarded in responding to temperature changes and shown as incased in heat-insulating material, and heat-absorptive means in heat-interchanging relation with the interior of one of said vessels, such means being designed to constitute a reservoir for heat.

The invention is capable of receiving a variety of mechanical expressions, two of which, for the purposes of illustration, have been shown on the accompanying drawing, but it is to be expressly understood that these embodiments have been selected for purposes of illustration only, and are not to be construed as definitive of the limits of the invention, reference being had to the appended claims for that purpose.

Figure 2:
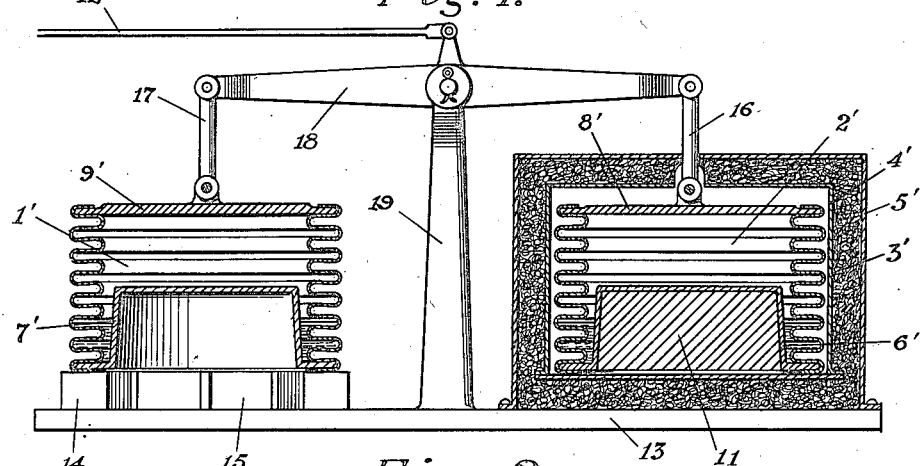

In the drawing, Figure 1 is a central, vertical section of a heat motor of the type disclosed in my Patent No. 824,858, referred to, and illustrating one embodiment of the invention; and Fig. 2 is a central, vertical section of a different embodiment of the invention.

Referring in detail to the drawing, wherein the same reference characters designate corresponding parts in the several figures, 1 and 2 (Fig. 1) represent two expansible and collapsible vessels, preferably constructed of corrugated resilient metal, such as brass, and each charged with an expansive agent, preferably a saturated vapor, *i. e.*, a vapor in the presence of its own liquid. Such vapor may, for example, be boron trichlorid, ethyl chlorid or ethylene oxid, as pointed out in my patent previously referred to. Vessel 2 is shown as retarded in responding to temperature changes by inclosure within a jacket or casing of heat-retarding or insulating material 3 such, for example, as animal hair or wool, the heat-insulating material being packed between the retaining walls 4 and 5. The inner of these retaining walls incloses a space sufficiently large to receive the vessel 2 and permit its maximum range of expansion and contraction without interfering therewith. Each of the vessels 1 and 2 comprises a fixed wall and, in the embodiment of Fig. 1, vessel 2 is provided with a fixed wall 6 shown as rigidly secured to the retaining wall 4, and the vessel 1 is provided with a fixed wall 7, which may for convenience be rigidly secured to the retaining wall 5. Each of these vessels is also provided with a movable wall and, as shown, vessel 2 is provided with a movable end wall 8 and vessel 1 with a movable end wall 9. The movable end walls are connected by any suitable connecting means, whereby such walls move in unison, and, in the form shown in Fig. 1 the connecting means takes the form of rods 10 of material that does not readily conduct heat, such as wood. In accordance with the present invention, heat-absorptive means are provided in heat-interchanging relation with the interior of the incased vessel 2, such absorptive means being designed to constitute a reservoir for heat, and preferably taking the form of a mass of heat-absorptive material such as cast iron, brine, alcohol, etc. In the embodiment of Fig. 1 the fixed end wall 6 of the vessel 2 is depressed to constitute a receptacle for the heat-absorptive material 11. Obviously the heat-absorptive material could be mounted in heat-interchanging relation with the interior of the vessel 2 in any other suitable way. The movable end wall 9 of the vessel 1 is provided with any suitable means, as diagrammatically illustrated at 12, for transmitting the power developed by the motor to any preferred means to be actuated.

In the embodiment illustrated in Fig. 2, the heat-insulating casing, comprising the retaining walls 4' and 5' and the incased heat-retarding material 3', is shown as mounted on a base plate 13, said casing inclosing the expansible and collapsible vessel 2', as heretofore described. The second expansible and collapsible vessel 1' is also mounted on the said base plate 13, a ring 14 provided with passages, as illustrated at 15, for the ready circulation of air therethrough, being shown as interposed between its stationary end wall 7' and said base plate 13. The movable end walls 8' and 9' of said vessels 2' and 1', respectively, are in this embodiment of the invention respectively connected by links 16 and 17 to the ends of a walking beam 18 pivotally mounted on a standard 19 rising from the base plate 13. It will be apparent that the power developed by this motor may be utilized in any suitable way, as by the connection 12'.

As in the embodiment of the invention shown in Fig. 1, the stationary end wall 6' of the vessel 2' is so shaped as to constitute a container for the heat-absorptive material 11.

While in the illustrated embodiments of the invention one end wall of each of the vessels is made reëntrant so as to extend a considerable distance within its respective vessel, thereby enabling the use of a relatively long vessel while maintaining the vapor space within the same comparatively small, and thereby retaining the sensitiveness of such device to temperature changes, it will be understood that, if desired, the end walls may be made plain or of any other suitable shape or form, and the vessels may be made of any desired length and diameter. Furthermore, while the vessels have been shown as of the same diameter, it will be understood that they may be made of different diameters by properly selecting the expansive agents with which they are charged, or, in the embodiment illustrated in Fig. 2, by properly proportioning the lever arms of the walking beam 18, provided, however, that whatever the shape and size of the connected vessels, and whatever the expansive agents with which they are charged, they should exactly balance each other when at the same temperature.

In operation, referring particularly to Fig. 1, vessel 1 being exposed to temperature changes and vessel 2 being shielded from temperature changes by the heat insulation, and thereby retarded in its response to temperature changes, a decrease in temperature of the medium surrounding vessel 1 will be accompanied by condensation of some of the fluid in said vessel, a contraction of said vessel, a corresponding expansion of vessel 2, and vaporization of some of the fluid within the latter vessel. Conversely, an increase in temperature of the medium surrounding vessel 1 will be accompanied by vaporization of some of the fluid in said vessel, an expansion of said vessel, a corresponding contraction of vessel 2, and condensation of some of the fluid within the latter vessel. In the latter case, some of the heat of vaporization latent in the vapor within the vessel 2 is given up, and, owing to the heat-insulating material surrounding this vessel, would tend to raise the temperature of the fluid within said vessel and diminish the temperature difference between the two vessels, opposing proper operation of the motor. Similarly, in the former case, the heat-insulation tends to retard absorption of the heat requisite to evaporation of this fluid, and thereby to lower the temperature thereof. With the employment, however, of a mass of heat-absorptive material in heat-interchanging relation with the interior of the vessel 2, this heat-absorptive means operates as a reservoir for the latent heat of vaporization and readily absorbs the same when some of said vapor is condensed. Thereby is the contraction of the vessel 2 not retarded. Some of this stored heat escapes through the heat-insulating walls, but a considerable portion of such heat is conserved for subsequent delivery to the vapor within the vessel 2, thereby facilitating evaporation of said fluid and expansion of said vessel when vessel 1 is contracted.

While the illustrated embodiments have been described with considerable detail and the invention shown as applied to a heat motor of a type heretofore known to the art, it is to be expressly understood that the invention is not limited to the forms shown, as the same is also of utility when used with other heat motors, or, in fact, with any thermosensitive means, whenever it is desired, for one reason or another, that the latent heat of vaporization of a fluid shall be readily absorbed or supplied to prevent retardation in the response of the device to temperature changes.

What is claimed is:—

1. The combination of two connected expansible and collapsible vessels each containing an expansive agent, a heat-retarding casing surrounding one of said vessels, and heat-absorptive means within said latter vessel.

2. The combination of an expansible and collapsible vessel containing an expansive agent and retarded in responding to variations in temperature, an expansible and collapsible vessel containing an expansive agent and exposed to variations in temperature, heat-absorptive means in said first-mentioned vessel, and means connecting movable parts of said vessels.

3. The combination of a casing of heat-insulating material, an expansible and collapsible vessel within said casing and having one end wall fixed to said casing, a second expansible and collapsible vessel without said casing and having a fixed end wall, the other end walls of said vessels being movable, means connecting said movable end walls, and heat-absorptive means within said first-named vessel.

4. The combination of a casing of heat-insulating material, an expansible and collapsible vessel within said casing and having one end wall fixed to said casing, a second expansible and collapsible vessel without said casing and having a fixed end wall, the other end walls of said vessels being movable, means connecting said movable end walls, and means to constitute a reservoir for heat in heating interchanging relation with said first-named vessel.

5. The combination of two connected expansible and collapsible vessels each containing an expansive agent, a heat-retarding casing surrounding one of said vessels, and a mass of heat-absorptive material within said latter vessel.

6. The combination of an expansible and collapsible vessel containing an expansive agent and retarded in responding to variations in temperature, an expansible and collapsible vessel containing an expansive agent and exposed to variations in temperature, a mass of heat-absorptive material in said first-mentioned vessel, and means connecting movable parts of said vessels.

7. The combination of a casing of heat-insulating material, an expansible and collapsible vessel within said casing and having one end wall fixed to said casing, a second expansible and collapsible vessel without said casing and having a fixed end wall, the other end walls of said vessels being movable, means connecting said movable end walls, and a mass of heat-absorptive material within said first-named vessel.

8. The combination of two connected expansible and collapsible vessels each containing an expansive agent, a heat-retarding casing surrounding one of said vessels, and heat-absorptive means in heat-interchanging relation with the interior of said latter vessel.

9. The combination of means containing a fluid responsive to temperature changes, a second means containing a fluid responsive to temperature changes, one of said means being exposed to temperature changes and the other of said means being shielded to retard temperature changes, operative connections between the aforesaid means, and heat-absorptive means in the said means shielded from temperature changes.

10. The combination of an expansible and collapsible vessel containing an expansive agent and retarded in responding to variations in temperature, an expansible and collapsible vessel containing an expansive agent and exposed to variations in temperature, heat-absorptive means in heat-interchanging relation with the interior of said first-mentioned vessel, and means connecting movable parts of said vessels.

11. The combination of two connected expansible and collapsible vessels each containing an expansive agent, and heat-absorptive means in the interior of one of said vessels.

12. In combination, a plurality of expansible and collapsible vessels each provided with a stationary wall and a movable wall and each charged with an expansive agent, certain of said vessels being retarded in responding to temperature changes and provided with heat-absorptive means, and certain of said vessels being exposed to temperature changes, and means connecting the movable walls of said vessels.

13. The combination of two connected expansible and collapsible vessels each containing an expansive agent, one of said vessels being provided with heat absorptive means.

14. In combination, an element containing a fluid responsive to temperature changes, a second element containing a fluid responsive to temperature changes, operative connections between movable parts of the aforesaid elements, and heat-absorptive means in heat-interchanging relation with the interior of one of said elements.

15. In combination, an element containing a fluid responsive to temperature changes, a second element containing a fluid responsive to temperature changes, operative connections between movable parts of the aforesaid elements, a heat-retarding casing surrounding one of said elements, and heat-absorptive means in heat-interchanging relation with the interior of said last-named element.

In testimony whereof I have signed this specification.

WESTON M. FULTON.